US006401975B2

(12) United States Patent
Diaz et al.

(10) Patent No.: US 6,401,975 B2
(45) Date of Patent: Jun. 11, 2002

(54) PRESSURIZED FLUID DELIVERY APPARATUS

(75) Inventors: Cesar Diaz, Rancho Santa Margarita; Douglas Patton, Irvine; Thomas Allen, Laguna Hills, all of CA (US)

(73) Assignee: Hydrus, Inc., Irvine, CA (US)

( * ) Notice: Subject to any disclaimer, the term of this patent is extended or adjusted under 35 U.S.C. 154(b) by 0 days.

(21) Appl. No.: 09/932,204

(22) Filed: Aug. 17, 2001

Related U.S. Application Data

(62) Division of application No. 09/280,759, filed on Mar. 29, 1999, now Pat. No. 6,276,567.

(51) Int. Cl.[7] .............................. B67B 7/00; G01F 11/00

(52) U.S. Cl. .............................. 222/1; 222/81; 222/95; 141/1; 141/114; 141/329; 604/28; 604/132; 604/147; 604/148

(58) Field of Search ................................ 222/1, 81, 82, 222/88, 95, 107, 325, 389; 128/DIG. 12, DIG. 13; 604/28, 131, 132, 140–148; 141/1, 114, 329, 330

(56) References Cited

U.S. PATENT DOCUMENTS

| | | | | |
|---|---|---|---|---|
| 1,614,532 A | | 1/1927 | Mobley | |
| 4,668,219 A | | 5/1927 | Israel | 604/85 |
| 3,066,670 A | | 12/1962 | Stauffer | |
| 3,136,313 A | | 6/1964 | Enstrom et al. | |
| 3,364,386 A | | 1/1968 | Fukuoka et al. | 604/411 |
| 3,605,744 A | | 9/1971 | Dwyer | |
| 4,041,944 A | | 8/1977 | Rhoades | 128/214 |
| 4,048,994 A | | 9/1977 | Lo | 128/214 |
| 4,234,095 A | | 11/1980 | Safianoff | 215/232 |
| 4,378,015 A | | 3/1983 | Wardlaw | 128/218 |
| 4,507,116 A | | 3/1985 | Leibinsohn | 604/142 |
| 4,539,004 A | | 9/1985 | Eckenhoff et al. | 128/131 |
| 4,627,419 A | | 12/1986 | Hills | 604/1 D |
| 4,650,475 A | | 3/1987 | Smith et al. | 604/189 |
| 4,655,741 A | | 4/1987 | Karmishima | 604/6 |
| 4,816,019 A | | 3/1989 | Kamen | 604/65 |
| 4,913,698 A | | 4/1990 | Ito et al. | 604/22 |
| 4,969,874 A | | 11/1990 | Michel et al. | 604/140 |
| 4,982,742 A | | 1/1991 | Broden | 128/760 |
| 5,009,641 A | | 4/1991 | Gorton | 604/131 |
| 5,053,011 A | | 10/1991 | Strobel | 604/142 |
| 5,059,182 A | | 10/1991 | Laing | 604/142 |
| 5,137,527 A | | 8/1992 | Miller et al. | 604/415 |
| 5,149,311 A | | 9/1992 | Pickhard | 604/153 |
| 5,163,583 A | | 11/1992 | Whitworth | 222/1 |
| 5,163,909 A | | 11/1992 | Stewart | 604/140 |
| 5,322,506 A | | 6/1994 | Kullas | 604/30 |
| 5,334,179 A | | 8/1994 | Poli et al. | 604/403 |
| 5,354,287 A | | 10/1994 | Wacks | 604/232 |
| 5,356,375 A | | 10/1994 | Higley | 604/30 |
| 5,364,371 A | | 11/1994 | Kamen | |
| 5,423,764 A | | 6/1995 | Adolf et al. | 604/415 |
| 5,526,853 A | | 6/1996 | McPhee et al. | 141/329 |
| 5,720,728 A | | 2/1998 | Ford | 604/131 |
| 5,743,878 A | | 4/1998 | Ross et al. | 604/131 |
| 5,749,854 A | | 5/1998 | Shen | 604/131 |
| 5,776,104 A | | 7/1998 | Guignard et al. | 604/132 |
| 5,824,000 A | | 10/1998 | Pavlo et al. | 604/142 |
| 5,891,097 A | | 4/1999 | Saito et al. | 604/141 |
| 6,276,567 B1 | * | 8/2001 | Diaz et al. | 222/81 |

* cited by examiner

*Primary Examiner*—Timothy L. Maust
(74) *Attorney, Agent, or Firm*—Sharon M. Webb; Foley, Hoag & Eliot. LLP

(57) ABSTRACT

A fluid delivery apparatus is provided that includes a pressure tube and a first cap assembly having a control system, with the first cap assembly coupled to a first end of the pressure tube for forming a gas-tight seal thereat. The apparatus also includes a second cap assembly coupled to a second end of the pressure tube for forming a gas-tight seal thereat, with the second cap assembly supporting a fluid container that is housed in the interior space of the pressure tube.

8 Claims, 11 Drawing Sheets

PRESSURIZED FLUID DELIVERY APPARATUS

This application is a divisional application of Ser. No. 09/280,759 filed on Mar. 29, 1999, U.S. Pat. No. 6,276,567 The aforementioned patent application is incorporated herein by reference.

BACKGROUND OF THE INVENTION

1. Field of the Invention

The present invention relates generally to fluid delivery apparatus, and in particular, to a fluid delivery system in which direct and uniform pressure can be applied onto the surface of a flexible container, to cause the fluid contained inside the flexible container to be delivered therefrom.

2. Description of the Prior Art

Effective and reliable fluid delivery is important in many applications, but is especially important in the medical field. Fluid delivery is often a critical and essential part of many medical procedures and in the care of patients. The most basic application is in the delivery of fluids, such as saline, blood or other medicine, that are stored in a flexible bag. Such fluids are often delivered intravenously to a patient during medical procedures, or during recovery or other treatments.

There currently exists several fluid delivery systems that are used to deliver fluids to a patient. One such system utilizes a pump to deliver the fluids from a fluid bag. However, fluid pumps can be expensive and subject to mechanical or other failure.

Other systems utilize bladders which are inflated or otherwise pressurized to expand and thereby impinge (i.e., apply pressure) on a fluid bag, causing fluid from the fluid bag to be expelled therefrom. However, such systems suffer from the drawback that the pressure applied to the fluid bag is not uniform and consistent, so that folds in the material of the fluid bag can develop as fluid is being expelled. This results in inconsistent flow of fluid from the fluid bag.

Thus, there still remains a need for a fluid delivery system in which pressure is provided in an effective and reliable manner.

SUMMARY OF THE DISCLOSURE

It is an object of the present invention to provide a fluid delivery apparatus in which pressure is provided in an effective and reliable manner.

It is another object of the present invention to provide a fluid delivery apparatus in which pressure is provided in a direct and uniform manner.

It is yet another object of the present invention to provide a fluid delivery apparatus which is simple to use, and which reduces the costs of the apparatus.

In order to accomplish the objects of the present invention, the present invention provides a fluid delivery apparatus that includes a pressure tube, and a first cap assembly having a control system, with first cap assembly coupled to a first end of the pressure tube for forming a gas-tight seal thereat. The apparatus also includes a second cap assembly coupled to a second end of the pressure tube for forming a gas-tight seal thereat, with the second cap assembly supporting a fluid container that is housed in the interior space of the pressure tube.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices, compositions, components, mechanisms and methods are omitted so as to not obscure the description of the present invention with unnecessary detail.

The present invention provides a fluid delivery apparatus 20 that utilizes pressure to cause fluid from a fluid container to be delivered therefrom. The fluid delivery apparatus applies direct and uniform pressure onto most of the entire surrounding surface area of the outer surface of the fluid container, thereby promoting the application of uniform pressure onto the fluid container to ensure the effective and reliable delivery of fluid.

Figure 1:
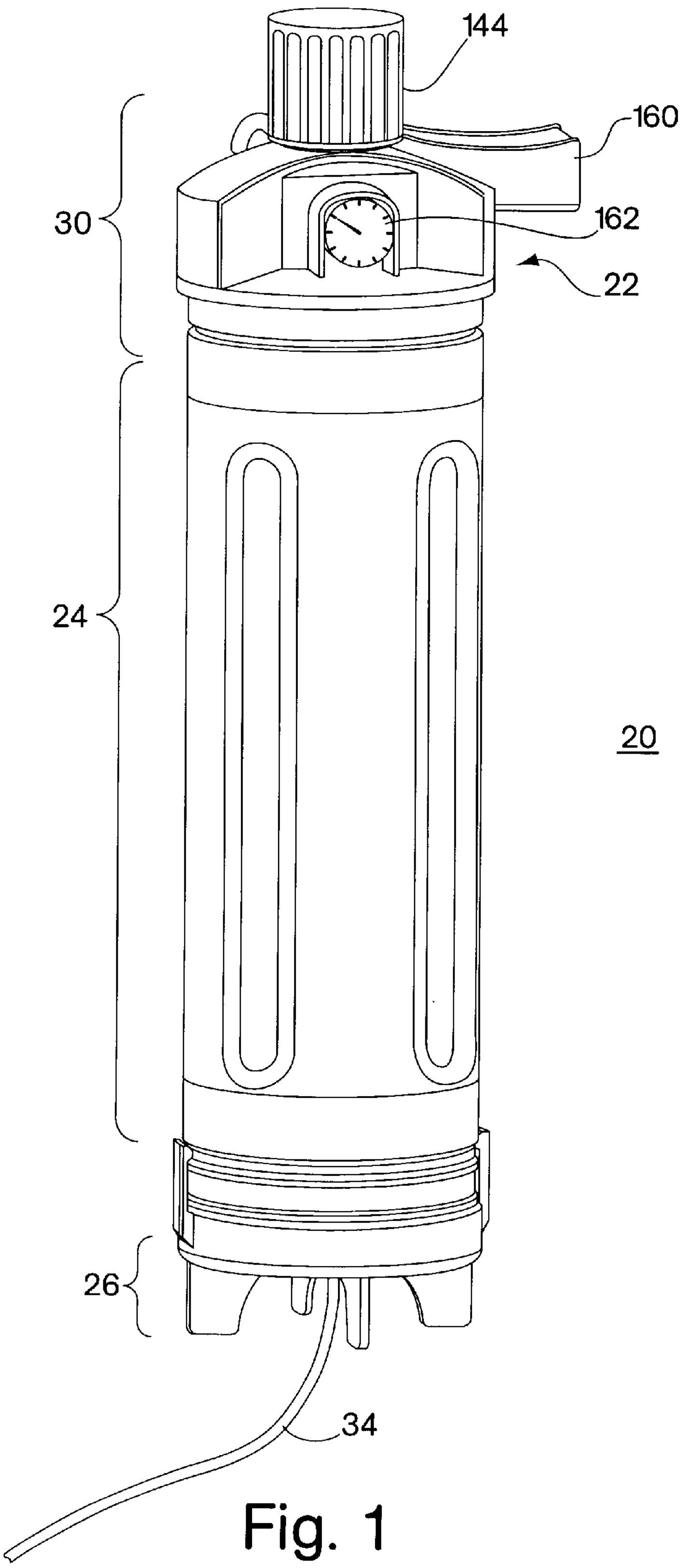
FIG. 1 is a front perspective view of a fluid delivery apparatus according to a first embodiment of the present invention.
Figure 2:
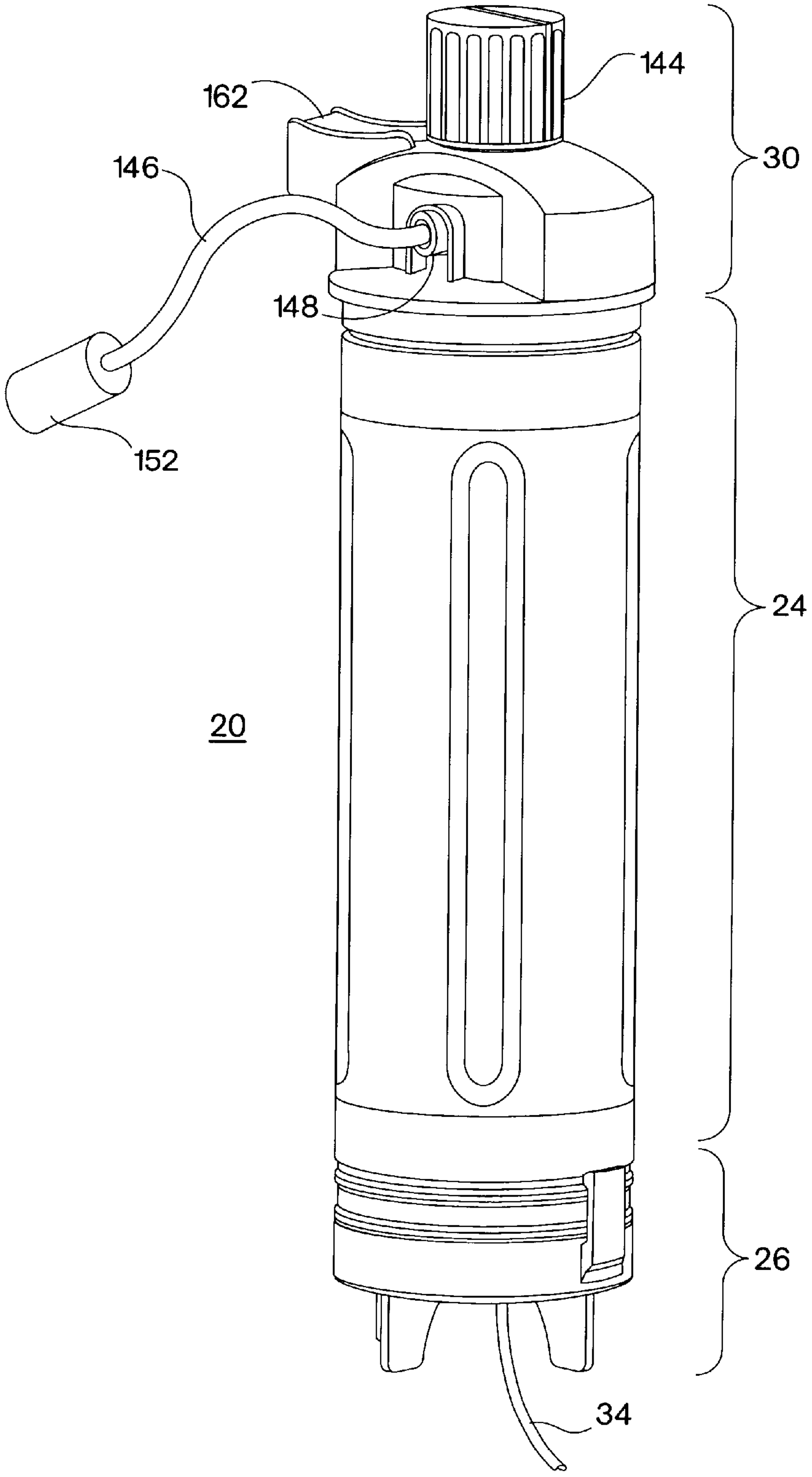
FIG. 2 is a rear perspective view of a fluid delivery apparatus of FIG. 1.
Figure 3:
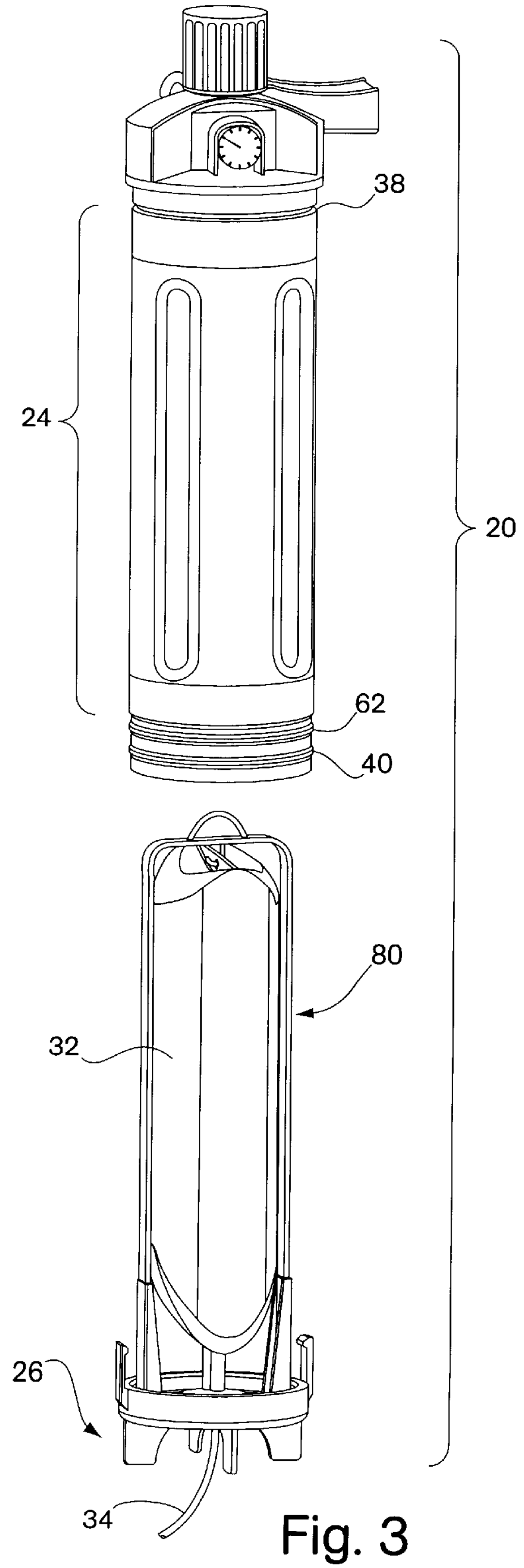
FIG. 3 is an exploded front perspective view of a fluid delivery apparatus of FIG. 1.

FIGS. 1–3 illustrate a fluid delivery apparatus 20 according to one embodiment of the present invention. In this embodiment, the apparatus 20 is a system that includes three basic assemblies or components: a control system 22 that is embodied in a top cap assembly 30, a pressure tube 24, and a bottom cap assembly 26. The control system 22 can be embodied in a top cap assembly 30 that is illustrated in greater detail in FIG. 10. The top cap assembly 30 forms a seal for one (i.e., top) end of the pressure tube 24.

The pressure tube 24 is generally cylindrical, and defines an inner chamber 31 (see FIG. 11) that functions to house or retain a fluid container 32 (which is described in greater detail below), and to promote the application of pressure onto the fluid container 32 such that the pressure is applied over 360 degrees around the circumference of the fluid container 32, and along at least 75 percent of the length of the fluid container 32. The pressure tube 24 is preferably made from a material that is capable of withstanding at least 20 percent more gas exerted load than the fluid container 32 without experiencing volumetric distortion. The greater load bearing capacity of the pressure tube 24 ensures that the gas pressure created inside the pressure tube 24 is effectively transferred to the outer surface of the fluid container 32. In addition, the stable volumetric design of the pressure tube 24 also ensures that proper and stable pressure is exerted onto the fluid container 24 during use.

The bottom cap assembly 26 functions to form a seal for the other (i.e., bottom) end of the pressure tube 24, and includes a mechanism for puncturing the fluid container 32 to couple the fluid contained in the fluid container 32 with a fluid transfer line 34. The fluid transfer line 34 can be an IV line that is inserted inside the body of a patient to deliver the fluid from the fluid container 32 to the patient.

Referring to FIG. 3, the bottom cap assembly 26 can also include a hanger assembly 80 that functions to hold and support the fluid container 24 in a manner that promotes the uniform application of pressure onto most of the entire surrounding surface area of the outer surface of the fluid container 32. The hanger assembly 80, and alternatives thereof, will be described in connection with FIGS. 6–8 below. As shown in FIG. 3, the top cap assembly 30 of the control system 22 can be coupled to the top 38 of the pressure tube 24 to form a gas seal, and the bottom cap assembly 26 can be removably coupled to the bottom 40 of the pressure tube 24 to form another gas seal.

Figure 4:
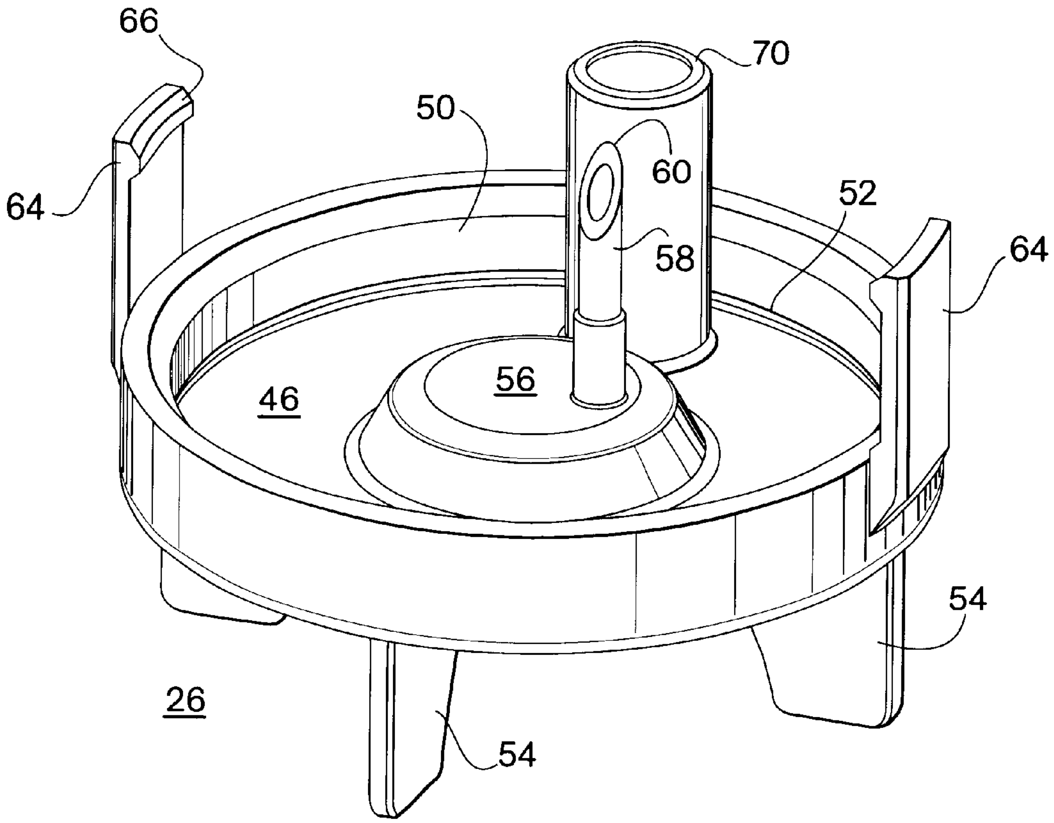
FIG. 4 is a perspective view of an embodiment of the bottom cap assembly for the fluid delivery apparatus of FIGS. 1 and 3.

The bottom cap assembly 26 will now be described in connection with FIG. 4. The bottom cap assembly 26 has a bottom wall 46 and a circumferential wall 48 extending therefrom to form a dish-like configuration. Threads 50 can be provided on the internal surface of wall 48 for engaging the bottom 40 of the pressure tube 24, and a gasket 52 can be provided at the base of the wall 48 against the bottom wall 46. The gasket 52 is used to form the gas-tight seal for the bottom 40 of the pressure tube 24. A plurality of legs 54 can be provided in spaced-apart manner about the circumference of the bottom wall 46 to raise the bottom cap assembly 26 (and therefore, the apparatus 20) above a supporting table top or other surface, so that there is room under the bottom wall.46 for the fluid line 34 to pass from the bottom wall 46 to the patient. The bottom wall 46 can further include a domed section 56 at about the center thereof, with a spike 58 provided at and extending vertically upwardly from the domed section 56. The spike 58 may be embodied in the form of a thin generally cylindrical tube having an angled top end 60 that defines a sharp tip that can be used to pierce the spike port of the fluid container 32. A guide tube 70 extends from the bottom wall 46, and can be used to guide and receive a support pole 72, such as that shown in FIG. 7.

As described above, the bottom cap assembly 26 has internal threads 50 that can be threaded to external threads 62 provided on the outer surface of the pressure tube 24 to secure the bottom cap assembly 26 to the bottom 40 of the pressure tube 24. However, to assist in this engagement, and to thereby increase the safety and reliability of the apparatus 20, two or more spaced-apart clips 64 can be provided. Each clip 64 extends vertically upwardly from the wall 48 and has a flange 66 that extends radially inwardly and which is adapted to clip onto corresponding notches (not shown) provided on the outer surface of the pressure tube 24 (see FIG. 3). In use, when the bottom cap assembly 26 is initially inserted into the bottom 40 of the pressure tube 24, the flanges 66 clip into the notches to temporarily grip or hold the pressure tube 24 while the user tightens the threaded connection between threads 50 and 62. Once the user turns bottom cap assembly 26 to engage the threads 50 and 62, the flanges 66 come out of the notches and the threaded connections take over the responsibility of gripping the pressure tube 24. The gas-tight seal is created by the gasket 52 after the threaded engagement has been completed.

Figure 5:
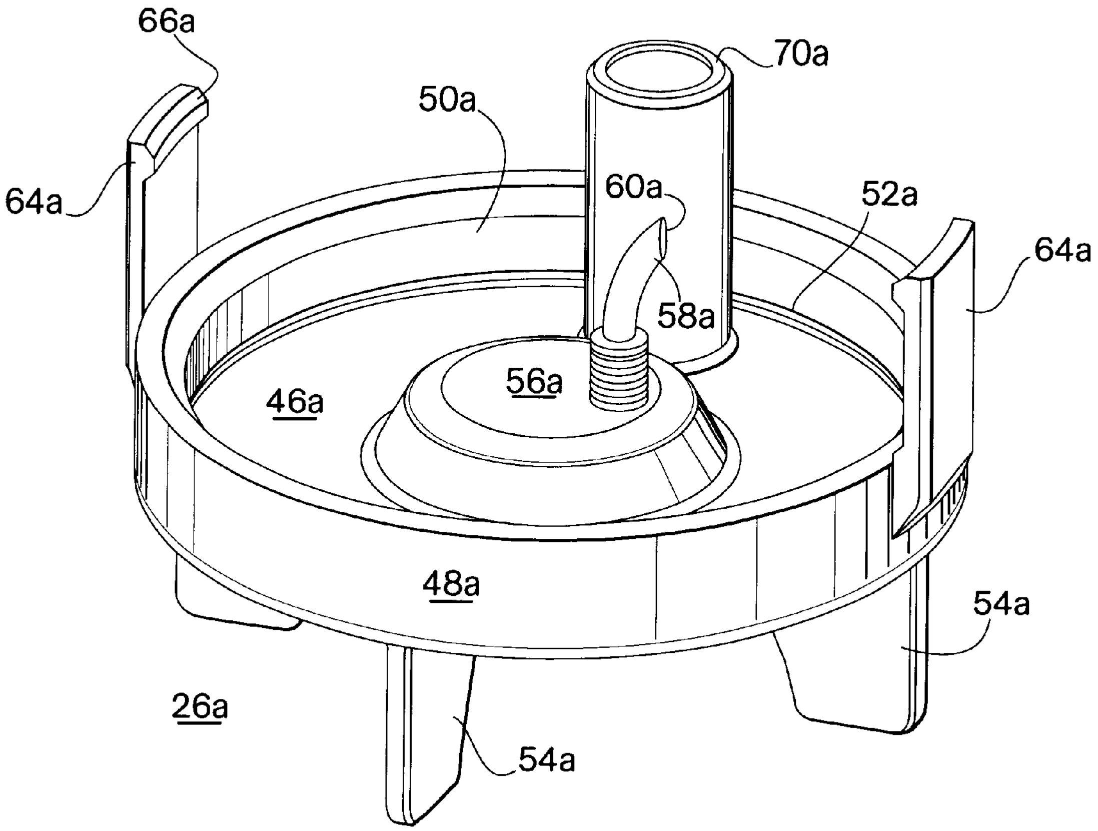
FIG. 5 is a perspective view of another embodiment of the bottom cap assembly for the fluid delivery apparatus of FIG. 1.

FIG. 5 illustrates another possible embodiment of a bottom cap assembly 26*a*. Assembly 26*a* is essentially the same as assembly 26, so the same elements are designated by the same numerals except that an "a" has been added in FIG. 5. Assembly 26*a* differs from assembly 26 in that the spike 58*a* is deflected at its top end 60*a*. The deflected top end 60*a* can be helpful in mounting the fluid container 32 onto the spike 58*a*. For example, where the fluid container 32 is a conventional sterile fluid bag, these sterile fluid bags are provided with a standardized spike port through which the spike 58*a* is to be inserted. A deflected top end 60*a* assists in the mounting procedure because it provides direct access to the spike port.

A hanger assembly can be coupled to the bottom cap assembly 26 to support a fluid container 32. The hanger assemblies described herein are provided in an integrated manner with the spike 58 (via the bottom cap assembly 26), which makes it easier and more convenient to install the fluid container 32 inside the pressure tube 24 for use.

Figure 6:
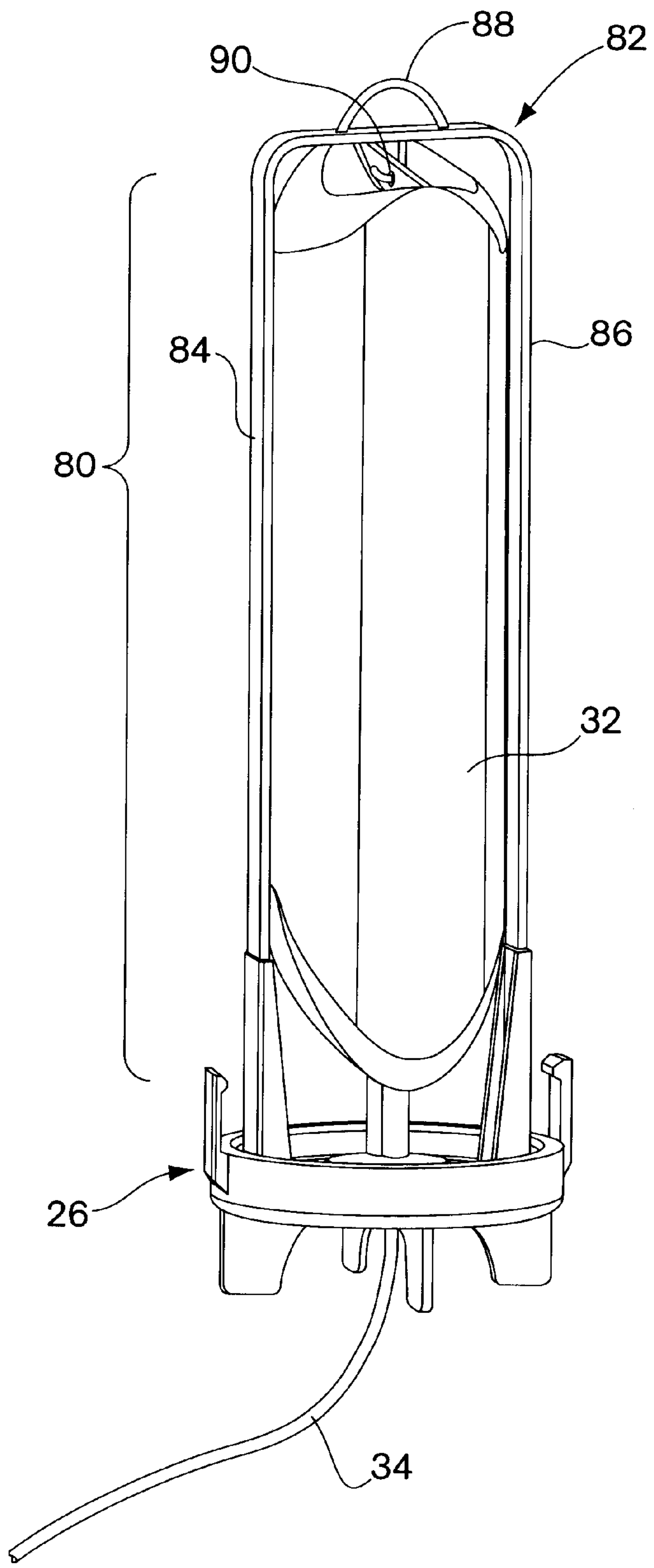
FIG. 6 is a perspective view of a hanger assembly that can be used with the bottom cap assembly of FIG. 4.

One example of a hanger assembly 80 is shown in FIG. 6. The hanger assembly 80 has a U-shaped support arch 82 that acts as a frame. The two legs 84, 86 of the support arch 82 can be mounted to the bottom wall 46 of the bottom cap assembly 26. A hanging loop 88 can be provided at the top of the support arch 82 for hanging the support arch 82 (and the bottom cap assembly 26) to a hook (not shown) provided inside the pressure tube 24 or from the top cap assembly 30 (e.g., from wall 140 described below). A hook 90 can be provided at the top of the support arch 82 for hanging the fluid container 32.

Figure 7:
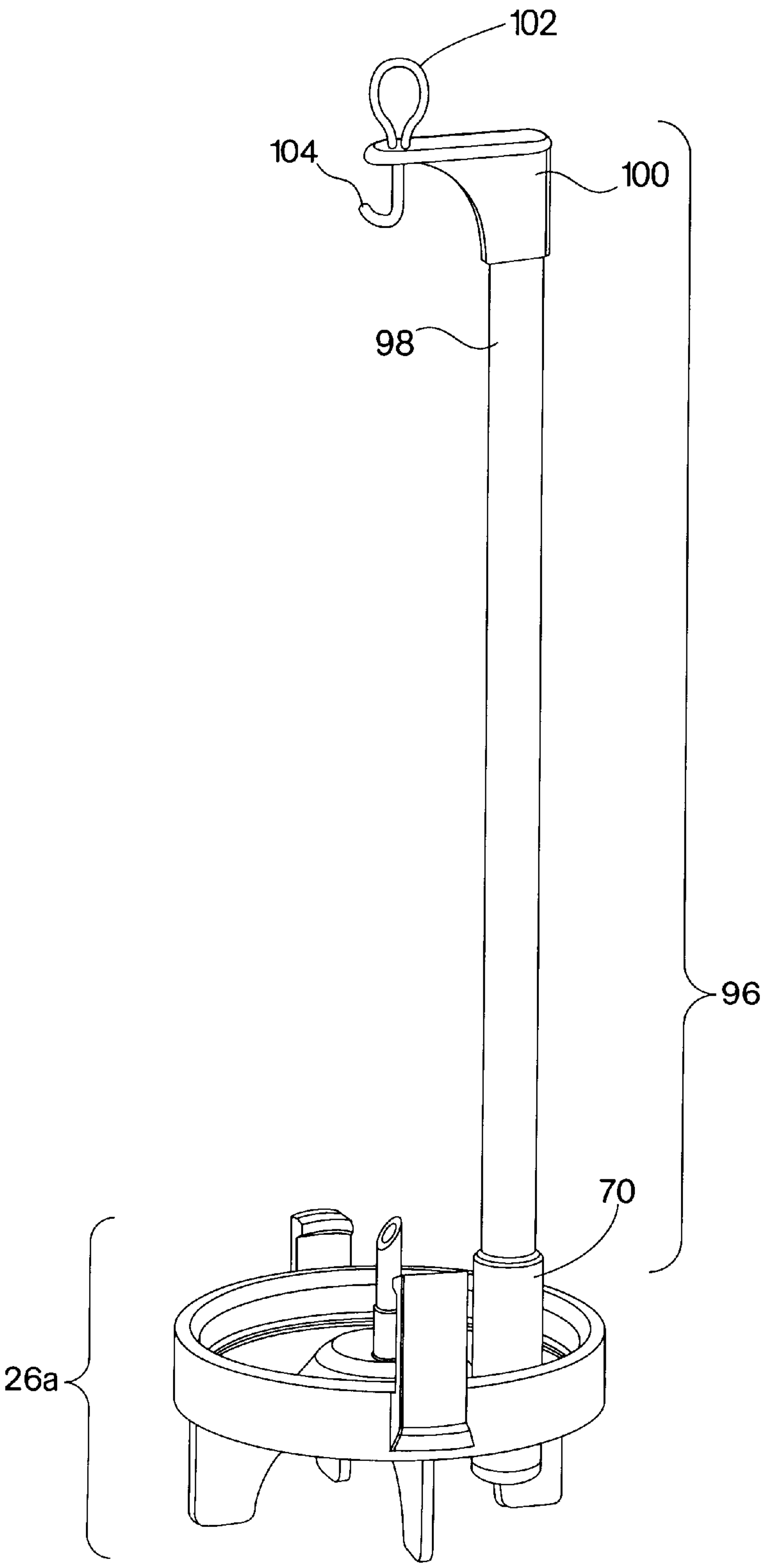
FIG. 7 is a perspective view of another hanger assembly that can be used with the bottom cap assembly of FIG. 4.

Another example of a hanger assembly 96 is shown in FIG. 7. The hanger assembly 96 has a support pole 98 having a bottom end that is received inside the guide tube 70 of the bottom cap assembly 26*a*. A cantilevered arm 100 is provided at the top end of the support pole 98. As with support arch 82, a hanging loop 102 and another loop 104 can be provided on the cantilevered arm 100.

Figure 8:
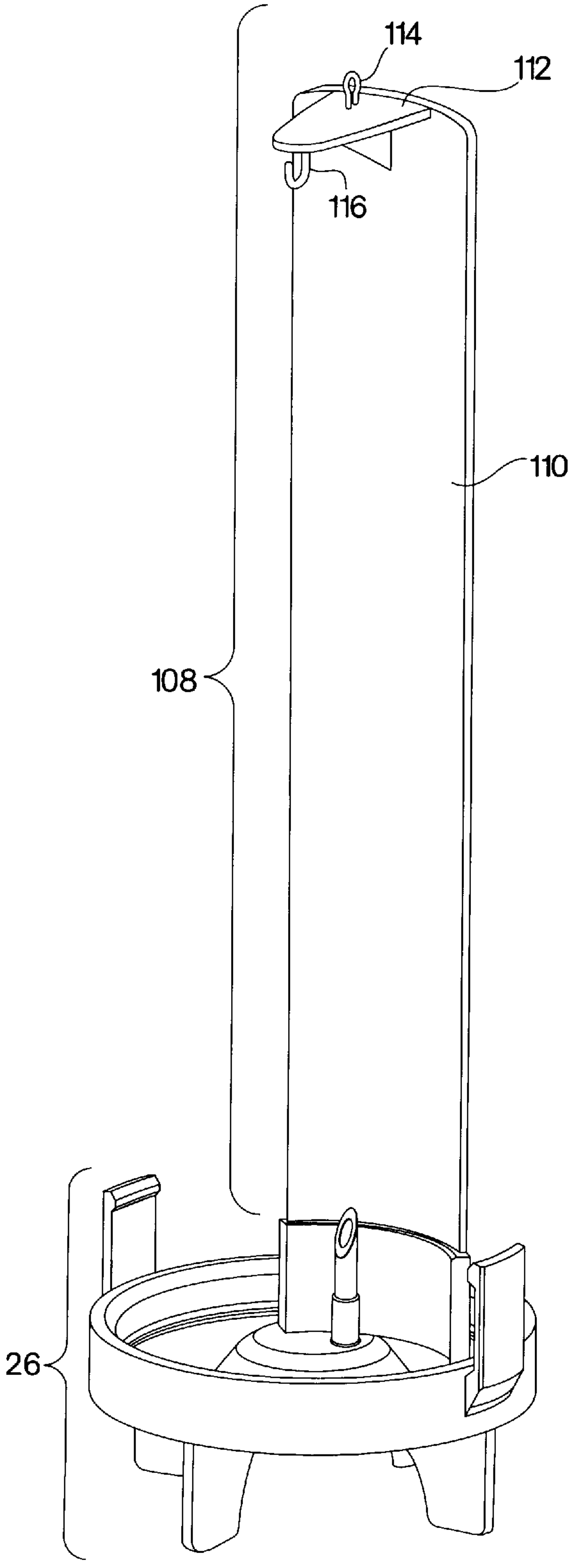
FIG. 8 is a perspective view of yet another hanger assembly that can be used with the bottom cap assembly of FIG. 4.

Yet another example of a hanger assembly 108 is shown in FIG. 8. The hanger assembly 108 has an arcuate support wall 110 having a bottom end that is mounted to the bottom wall 46 of the bottom cap assembly 26. A cantilevered arm 112 is provided at the top end of the support wall 110. As with support arch 82, a hanging loop 114 and another loop 116 can be provided on the cantilevered arm 112. The arcuate nature of the support wall 110 allows the flexible fluid container 32 to be rested on the wall 110 when the apparatus 20 is laid flat on its side on a table or other surface. To facilitate this, the wall 110 should be positioned on the bottom wall 46 of the bottom cap assembly 26 at a slight angle to the fluid port 148 (see FIG. 2) in the control system 22 so that the fluid will flow towards the port 148 when the entire apparatus 20 is laid flat on its side.

Figure 9:
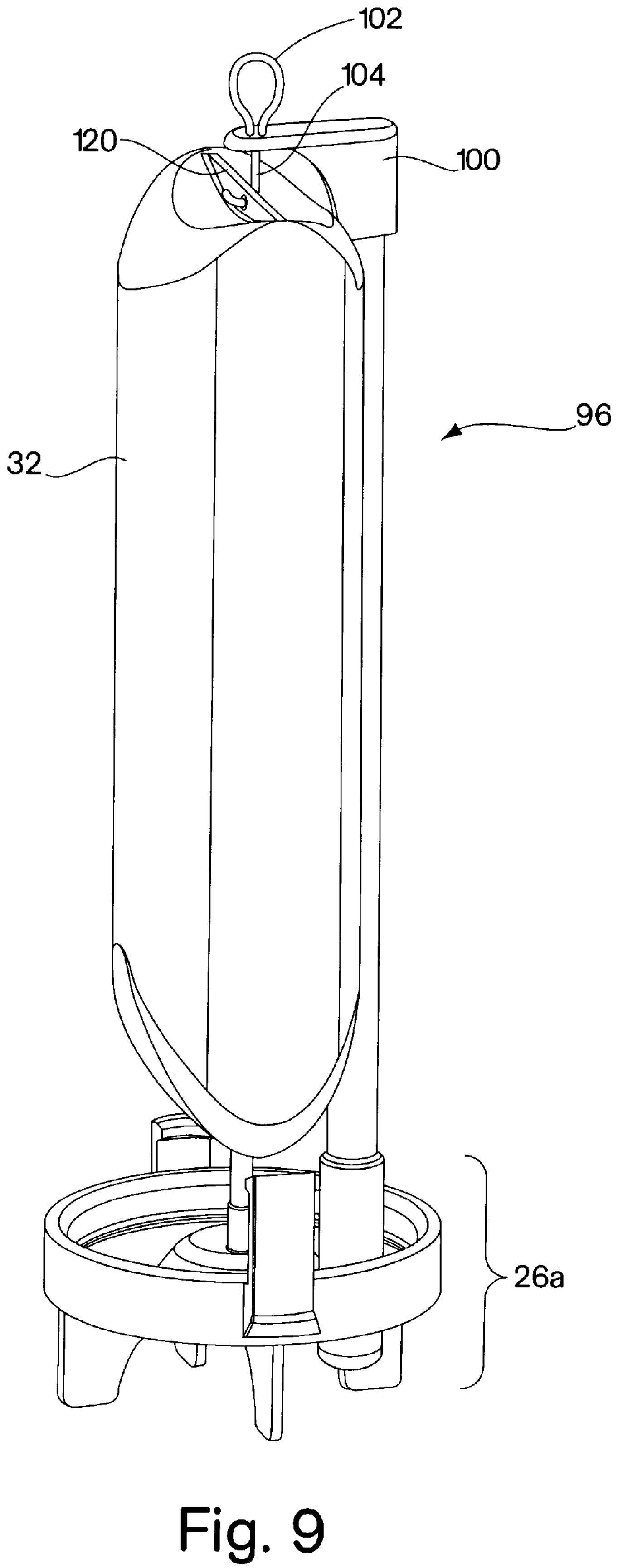
FIG. 9 is a perspective view of the hanger and bottom cap assemblies of FIG. 7 shown in use with a fluid container suspended therefrom.

FIG. 9 illustrates the bottom cap assembly 26*a* and hanger assembly 96 in use, holding a fluid container 32. The fluid container 32 can be any flexible or compliant fluid container, including standard sterile fluid or IV bags made by Baxter Healthcare Corp. of Illinois, Abbott Laboratories of Illinois, and B. Braun of Germany, among others. In FIG. 9, the fluid container 32 is embodied in the form of a sterile fluid bag, such as an IV bag or a blood bag. As shown in FIG. 9, the fluid container 32 has a bar 120 provided at its top end which can be suspended from the hook 104. In addition, the spike 58*a* has been inserted through the spike port adjacent the bottom end of the fluid container 32.

Figure 10:
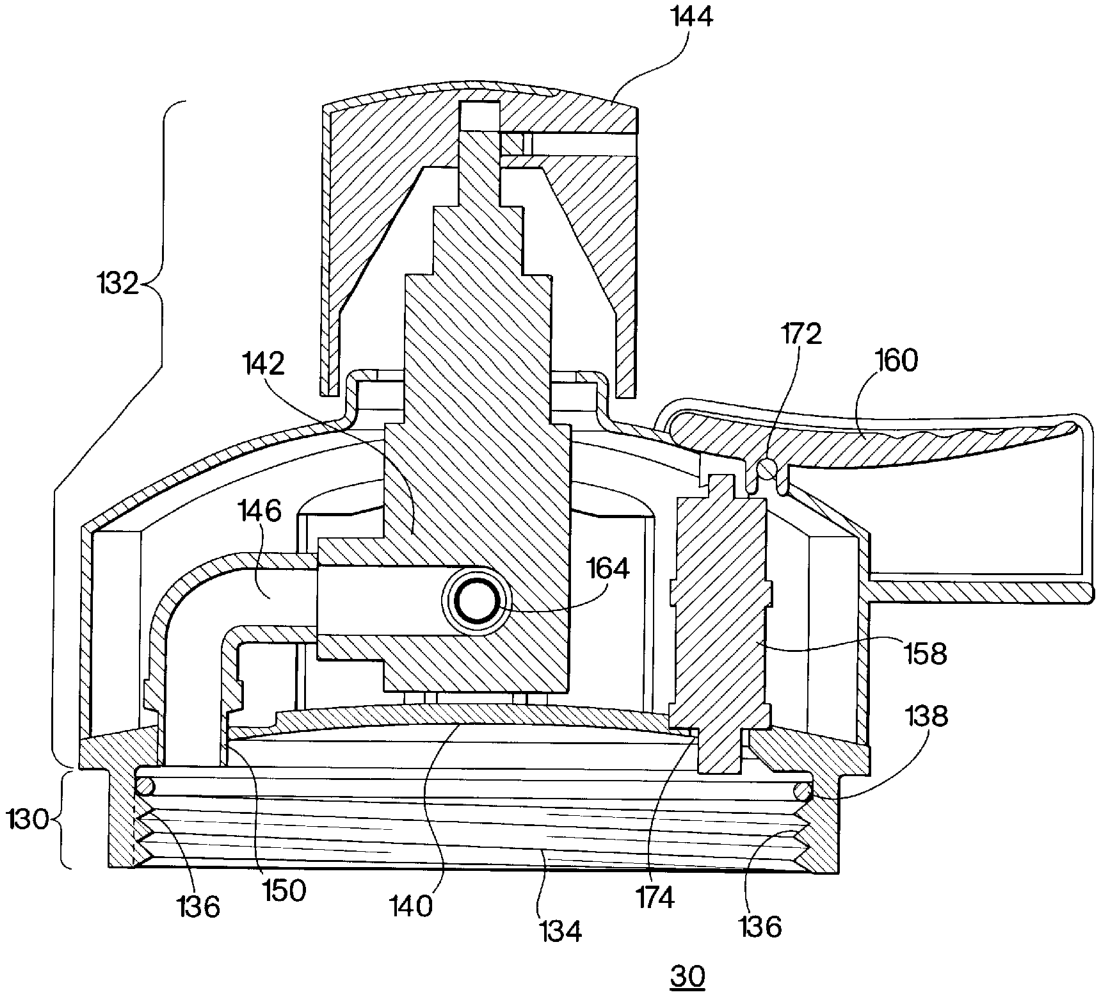
FIG. 10 is a cross-sectional view of the control system of the fluid delivery apparatus of FIG. 1.

The top cap assembly 30 and control system 22 will be described with reference to FIGS. 1, 2 and 10. The top cap assembly 30 has a lower housing 130 and an upper housing 132. The lower housing 130 defines a cylindrical bore 134 having internal threads 136 that are adapted to engage external threads provided on the outer surface of the pressure tube 24. A gasket 138 is also provided at the top of the bore 134 adjacent the wall 140 that divides the lower and upper housings 130, 132.

Inside the upper housing 132 is provided an air pressure regulator 142 that is supported on the wall 140. The air pressure regulator 142 operates to maintain constant pressure in the apparatus 20. An air regulator knob 144 is coupled to the top of the air pressure regulator 142, and allows the user to adjust the incoming air down to the required pressure rating used for the apparatus 20. An air line 146 extends through a first port 148 (see FIG. 2) in the upper housing 132, and passes through air pressure regulator 142 and a second port 150 in the wall 140. Thus, the air line 146 communicates between a source 152 and the interior of the pressure tube 24 (i.e., of which the bore 134 becomes a part after the lower housing 130 is threadably engaged with the top 38 of the pressure tube 24). The source 152 can be a container that is used to contain air, and in the present invention, "air" can be defined to include ambient air and specific gases, such as but not limited to argon, carbon dioxide, and nitrogen. In addition, the upper housing 132 can include an air relief valve 158 that is coupled to a lever arm 160. The relief valve 158 operates to release pressure in the event the pressure in the apparatus 20 exceeds a predetermined safety limit (i.e., "over-pressure situation"). Even though the air pressure regulator 142 is expected to maintain constant pressure, the relief valve 158 provides additional safety in the event the air pressure regulator 142 fails or malfunctions. A pressure gauge 162 can be mounted on to the air pressure regulator 142 at a mount hole 164.

The set-up, use and operation of the apparatus 20 will now be described with reference to FIGS. 1–3 and 10–11. First, the upper cap assembly 30 can be provided integral with the pressure tube 24, or can be provided separately, and then secured together by threaded engagement in the manner described above. Thereafter, the user takes the fluid container 32, hangs it on the appropriate hanger assembly, and then causes the spike 58 or 58*a* to pierce the spike port on the fluid container 32. The user then takes the bottom cap assembly 26 and its hanger assembly and inserts the hanger assembly and fluid container 32 into the chamber 31 of the pressure tube 24 via the opening in the bottom 40 thereof. The clips 64 initially latch on to the notches 68, but this is disengaged when the user turns the bottom cap assembly 26 to cause the threads 50, 62 to engage. After the top and bottom cap assemblies 30, 26 have been secured in place, a gas-tight seal is created inside the pressure tube 24, and the apparatus is ready for use.

Figure 11:
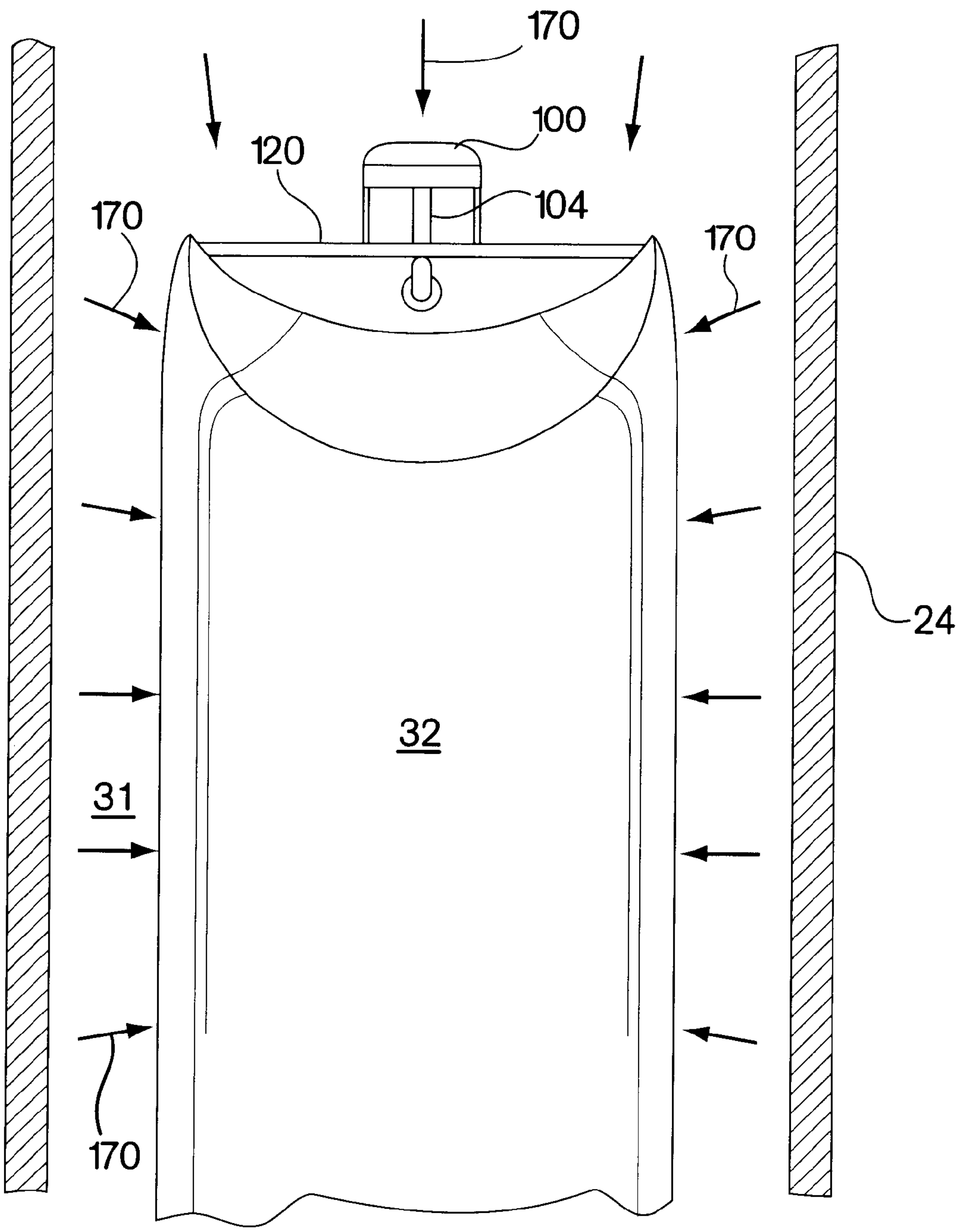
FIG. 11 is a cross-sectional view of a portion of the fluid delivery apparatus of FIG. 1 illustrating its operation.

To begin use, the user turns the air regulator knob 144, which introduces air from the source 152 into the apparatus 20. Turning the knob 144 also allows the user to adjust the pressure in apparatus 20 to the desired pressure rating. This adjustment can be viewed at the gauge 162, which displays the pressure. The air from the source 152 enters the pressure tube 24 via the air line 146. Referring now to FIG. 11, the air that enters the chamber 31 exerts gas pressure on to the wall of the flexible fluid container 32 to cause fluid to be discharged from inside the fluid container 32. Since the fluid container 32 is supported by a hanger assembly to be positioned at the center of the chamber 31, uniform gas pressure can be applied (see arrows 170) to a large portion of the surface area of the fluid container 32, thereby ensuring that the fluid contained therein is discharged at a consistent flow rate. The fluid is discharged via the spike 58 or 58*a* to the fluid line 34 for delivery to the patient or other intended recipient.

In the event of an over-pressure situation, the air relief valve 158 will open automatically to vent to the atmosphere. Such relief valves and their operations are well-known in the art, and such will not be described in greater detail herein.

When the fluid inside the fluid container 32 has been depleted and it is desired to replace the fluid container 32, the user can turn the air regulator adjustment knob 144 down to zero pressure, and then manually release the gas (i.e., pressure) from apparatus 20 by pressing on the lever 160. As shown in FIG. 10, the lever is rotatably coupled to the relief valve 158 by a pin 172, so that when the lever 160 is pressed vertically downward, the relief valve 158 is raised to vent the chamber 31 via a vent port 174 provided in the wall 140. The supply of air from the source 152 can be turned off either by the air regulator adjustment knob 144, an on/off switch (not shown, but can be provided), or at the base of the air line 146. The bottom cap assembly 26 can then be unscrewed from the bottom 40 of the pressure tube 24, and the fluid container 32 disposed of. In one embodiment, the entire bottom cap assembly 26 and hanger assembly is disposed as well, and a new bottom cap assembly 26 and hanger assembly is introduced together with a new fluid container 32 in the manner described above. In another embodiment, the existing bottom cap assembly 26 and hanger assembly can be re-used by hanging a new fluid container 32 on to the hanger assembly, and securing the existing bottom cap assembly 26 and hanger assembly (with the new fluid container 32) to the bottom 40 of the pressure tube 24 in the manner described above.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for infusing a therapeutic dose of fluid into a vein, comprising:

providing a preselected number of assemblies, each assembly comprising a hangar with a proximal and a distal end, a base to which is mounted the proximal end of the hangar, and a spike integrated with the base, and each assembly being dimensionally adapted for holding at least one container containing fluid suitable for delivery into the vein;

providing at least one pressure tube comprising a pressure inlet, an interior chamber and an open end;

providing a preselected number of containers containing fluid suitable for delivery into a vein, each container comprising a top end, a bottom end and a spike port;

providing an intravenous tubing suitable for delivering fluid into the vein;

preparing each of the preselected number of assemblies by loading each assembly with at least one container, said loading comprising the steps of attaching the top end of the at least one container to the distal end of the hanger of each assembly and affixing each container so that it extends axially from the distal end of the hangar to the base in each assembly;

positioning the spike port of the at least one container in proximity to the spike of its respective assembly;

inserting a first assembly bearing a first container into the at least one pressure tube;

sealing the first assembly within the at least one pressure tube with a gas-tight seal;

establishing fluid communication between the container and the intravenous tubing;

admitting pressurized air into the interior chamber of the at least one pressure tube through the pressure inlet to apply a preselected amount of pressure to the first container;

delivering a preselected amount of fluid from the first container into the intravenous tubing;

stopping fluid flow from the first container into the intravenous tubing;

releasing the pressure within the at least one pressure tube;

removing the first assembly from the at least one pressure tube; and repeating the steps of sequentially inserting each of the preselected number of assemblies into the pressure tube, sealing each assembly within the at least one pressure tube, establishing fluid communication between the at least one container carried on each assembly and the intravenous tubing, admitting pressurized air into the interior chamber of the at least one pressure tube, delivering a preselected amount of fluid into the intravenous tubing, stopping the fluid flow, releasing the pressure within the at least one pressure tube and removing each assembly until the therapeutic dose of fluid has been infused into the vein.

2. The method of claim 1, wherein the assembly is disposable.

3. The method of claim 1, wherein the pressure tube is disposable.

4. The method of claim 1, wherein the fluid is a crystalloid.

5. The method of claim 1, wherein the fluid is a colloid.

6. The method of claim 1, wherein the fluid comprises a blood component.

7. The method of claim 6, wherein the blood component comprises blood cells.

8. The method of claim 6, wherein the blood component comprises blood plasma.

* * * * *